(12) United States Patent
Biagioni et al.

(10) Patent No.: US 12,474,179 B2
(45) Date of Patent: Nov. 18, 2025

(54) SYSTEMS AND METHODS FOR IDENTIFYING MAP GEOSPATIAL FEATURES

(71) Applicant: Toyota Jidosha Kabushiki Kaisha, Toyota (JP)

(72) Inventors: James Peter Biagioni, Seattle, WA (US); James Kluz, New York, NY (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/405,541

(22) Filed: Jan. 5, 2024

(65) Prior Publication Data
US 2025/0224248 A1    Jul. 10, 2025

(51) Int. Cl.
*G01C 21/00*    (2006.01)
(52) U.S. Cl.
CPC ..... *G01C 21/3815* (2020.08); *G01C 21/3841* (2020.08); *G01C 21/3852* (2020.08)
(58) Field of Classification Search
CPC ............ G01C 21/3815; G01C 21/3841; G01C 21/3852
See application file for complete search history.

(56) References Cited

U.S. PATENT DOCUMENTS

| | | |
|---|---|---|
| 6,684,219 B1 | 1/2004 | Shaw et al. |
| 7,085,650 B2 | 8/2006 | Anderson |
| 2006/0041375 A1 | 2/2006 | Witmer et al. |
| 2020/0372624 A1* | 11/2020 | Braun .............. G06T 7/11 |
| 2022/0131375 A1 | 4/2022 | Davis, II |

FOREIGN PATENT DOCUMENTS

| | | | |
|---|---|---|---|
| CN | 105551028 B | 2/2018 | |
| WO | WO-2021251992 A1 * | 12/2021 | ......... G06Q 30/0205 |

OTHER PUBLICATIONS

Zhao, Renliang et al., "Updating Geospatial Data from Large Scale Data Sources", International Archives of the Photogrammetry, Remote Sensing and Spatial Information Sciences, vol. XXXVIII-4/W25, 2011 ISPRS Guilin 2011 Workshop, Oct. 20-21, 2011, Guilin, China.

Zhai, Z. K. et al., "Dynamic Updating Method of Geospatial Database with Incremental Data", The International Archives of the Photogrammetry, Remote Sensing and Spatial Information Sciences, vol. XLIII-B3-2022 XXIV ISPRS Congress (2022 edition), Jun. 6-11, 2022, Nice, France.

* cited by examiner

*Primary Examiner* — Rodney A Butler
(74) *Attorney, Agent, or Firm* — Dinsmore & Shohl LLP (57) ABSTRACT

Disclosed apparatuses and methods for identifying map geospatial features include a processor operable to extract, through spatial analysis, geospatial features from map data of a road network at a location, determine, through a similarity analysis, whether two or more of the geospatial features have an identical score beyond an identical score threshold, in response to determining that the identical score of the two or more of the geospatial features is beyond the identical score threshold, assign the shared geospatial hash to the two or more geospatial features in maps of the road network. The geospatial features include the location, geospatial attributes, topological attributes, classification attributes, and temporal information.

20 Claims, 6 Drawing Sheets

SYSTEMS AND METHODS FOR IDENTIFYING MAP GEOSPATIAL FEATURES

TECHNICAL FIELD

The present disclosure relates to systems and methods for map information generation, more specifically, to systems and methods for map information generation for geospatial features.

BACKGROUND

Maps are useful in guiding individuals and vehicles to optimal routes between locations. Geospatial mapping, encompassing geospatial features such as physical landmarks, roads, and boundaries, is instrumental in analyzing and comprehending patterns, trends, and relationships within a geographical area. Very often, the geospatial features exhibit greater stability compared to non-geospatial features and may remain consistent across different maps of the same geographic region. Consequently, there is a demand for a system and method that can identify geospatial features and efficiently manage them across diverse maps depicting the same area.

SUMMARY

In one embodiment, an apparatus for identifying map geospatial features includes a processor operable to extract, through spatial analysis, geospatial features from map data of a road network at a location, the geospatial features including the location, geospatial attributes, topological attributes, classification attributes, and temporal information, determine, through a similarity analysis, whether two or more of the geospatial features have an identical score beyond an identical score threshold, in response to determining that the identical score of the two or more of the geospatial features is beyond the identical score threshold, assign the shared geospatial hash to the two or more geospatial features in maps of the road network.

In another embodiment, a method for identifying map geospatial features includes extracting, through spatial analysis, geospatial features associated with a road network at a location from map data, the geospatial features including comprising the location, geospatial attributes, topological attributes, classification attributes, and temporal information, determining, through a similarity analysis, whether two or more of the geospatial features have an identical score beyond an identical score threshold, in response to determining that the identical score of the two or more of the geospatial features is beyond the identical score threshold, assigning the shared geospatial hash to the two or more geospatial features in maps of the road network.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The disclosed embodiments include systems and methods for the identification of geospatial features within one or more maps, with a specific focus on road networks across diverse maps. These systems assign geospatial hashes and identifications to ensure consistency in depicting identical features across maps. Maps often encounter inconsistencies, posing challenges for users seeking uniform and current information. Discrepancies in illustrating road networks may lead to confusion, and navigation errors, and hinder effective planning. Furthermore, the absence of cross-referenced geospatial information on maps restricts users from acquiring sufficient data for analysis or decision-making, a notable limitation in scenarios demanding desirable spatial information, such as urban planning, infrastructure development, and environmental management.

The disclosed systems and methods present a robust approach to geospatial feature identification. By generating geospatial hashes across various maps, the disclosed systems and methods provide consistency, allowing users to leverage mapping applications for efficient route planning. The consistent geospatial hashes or identifications assigned to features contribute to a more detailed and informative mapping experience, facilitating improved spatial analysis and sound decision-making across diverse domains. Additionally, the systems and methods offer temporal guidance, allowing users to comprehend the evolution of road network geospatial features over time. The temporal feature enables users to study the impact of changes in geospatial features on traffic and environmental management. Consequently, the presented systems and methods for identifying map geospatial features are useful to enhance efficiency, reduce costs, and elevate the overall user experience in various map management applications.

Various embodiments of the methods and systems for generating drop-off points in a map are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Figure 1:
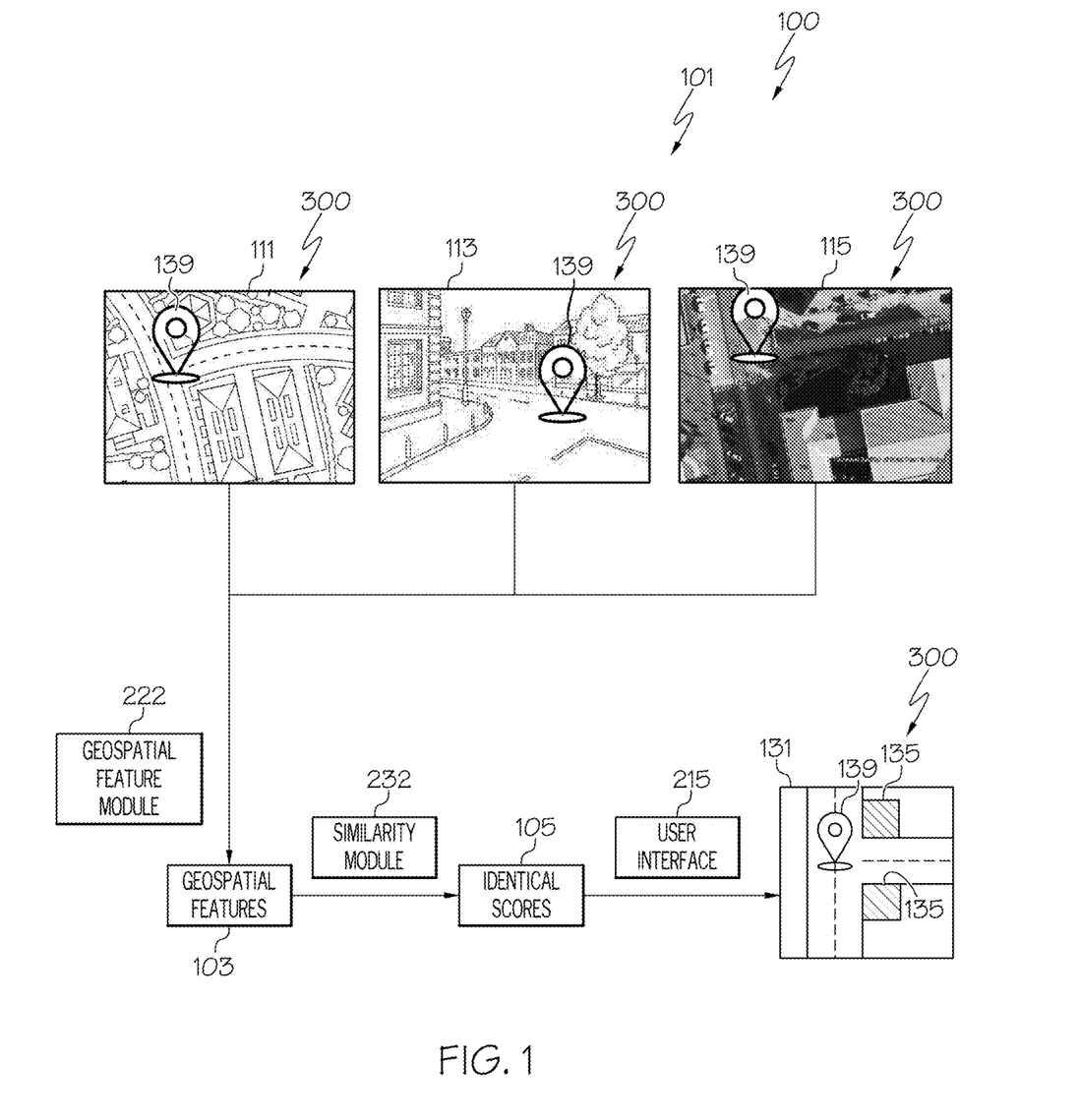
FIG. 1 schematically depicts an example system for identifying map geospatial features of the present disclosure, in accordance with one or more embodiments shown and described herewith.

Referring to the figures, FIG. 1 schematically depicts an example geospatial feature identification system 100. The geospatial feature identification system 100 may include one or more modules to receive map data 101 of a road network 300 and process the map data 101 to identify geospatial features 103 of the road network 300 and assign geospatial hashes 135 to the geospatial features 103. The geospatial feature identification system 100 may include a user interface 215. The geospatial hashes 135 may be labeled on a geospatial hash map 131 with identification numbers. Each geospatial hash 135 may be represented as a point or an area of interest or a specific location associated with that hash 135. The identification number may serve as a unique identifier for that particular geospatial hash 135.

Figure 2:
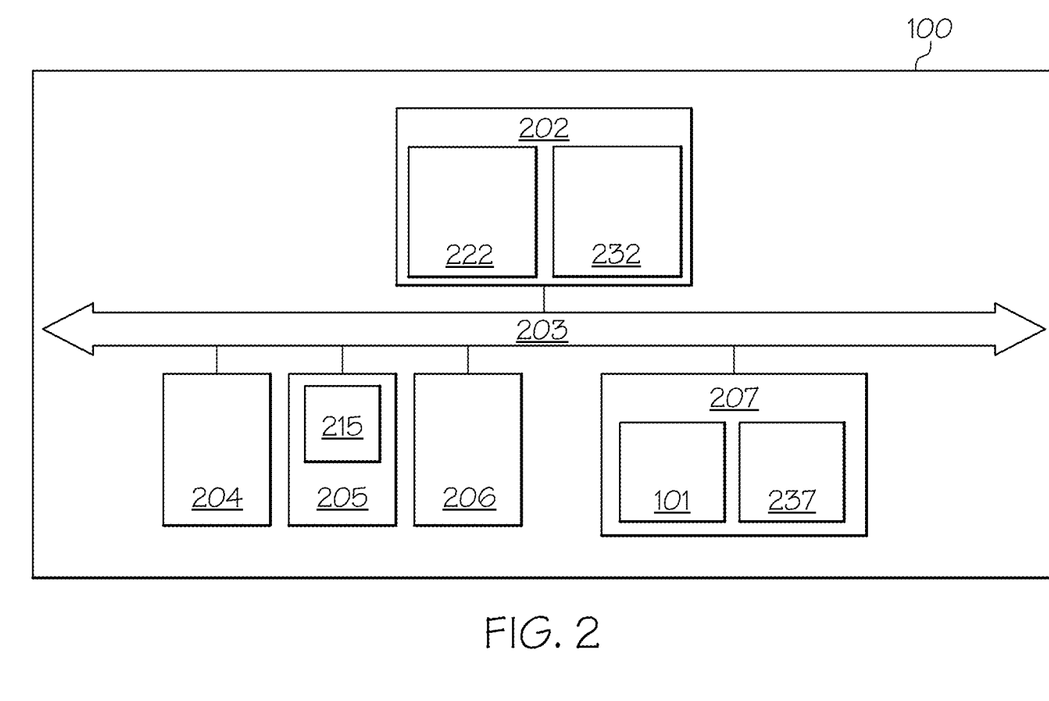
FIG. 2 schematically depicts example components of the system for identifying map geospatial features of the present disclosure, according to one or more embodiments shown and described herein.

The map data 101 may include one or more maps 111 of a road network 300 at a location 139, one or more satellite images 115 of the road network 300 at the location 139, one or more local images 113 (or videos) of the road network 300 at the location 139. The map data 101 may be stored in the geospatial feature identification system 100, such as in a data storage component 207 (as illustrated in FIG. 2), or received from external resources, such as map Application Programming Interfaces, (e.g., Google Maps and Bing Maps), satellite data provider (e.g., NASA Earth Observing System), geospatial data provider (e.g., Maxar and DigitalGlobe), individuals and vehicles, and other resources providing map data 101.

The geospatial feature identification system 100 may include the user interface 215. The user interface 215 may include a tangible object, wherein the tangible object is a marker, a physical model, a sensor, a wearable motion-tracking device, or a smartphone. The user interface 215 may be, without limitations, a keyboard, a touchpad, a joystick, a voice control module in mobile phones, wrist bands that may include electromyographic electrodes that can record hand gestures, and/or devices including electroencephalogram (EEG) electrodes to detect human intentions such as brain waves. For example, a keyboard allows users to input text and commands through physical or virtual keys. A touchpad may include a touch-sensitive surface that allows users to interact with the geospatial feature identification system 100 by tapping, swiping, and performing various gestures. The user interface 215 may display geospatial features 103 for users to accept or decline whether to assign a geospatial hash 135 to the geospatial features 103.

The one or more modules of the geospatial feature identification system 100, such as a geospatial feature module 222, may extract geospatial features 103 from the map data 101 and further compare the extracted geospatial features 103 across different map data 101 to determine whether two or more of the geospatial features 103 represent an identical geospatial feature 103. The geospatial feature 103 may include a location, geospatial attributes, topological attributes, classification attributes, and temporal information of the geospatial feature 103. The temporal information may reflect the changes of the road network 300 over time. For example, the temporal information may be useful for the geospatial feature identification system 100 to determine the changes of the geospatial features 103 due to road infrastructure (e.g., modification to curbs, lane configuration, or additions/removal of medians), road maintenance and repairs, land use changes.

The one or more modules of the geospatial feature identification system 100, such as a similarity module 232, may determine whether two or more of the geospatial features 103 extracted from different map data 101 represent the same geospatial feature 103. For example, the similarity module 232 may determine whether the two or more of the geospatial features 103 have an identical score 105 beyond an identical score threshold. Upon determining that two or more of the geospatial features 103 extracted from different map data 101 represent the same geospatial feature 103, the geospatial feature identification system 100 may assign a shared geospatial hash 135 to the two or more geospatial features 103 in the geospatial hash maps 131 such that the identical geospatial feature 103 is represented as the same shared geospatial hash 135 in different geospatial hash maps 131. In some embodiments, the shared geospatial hash 135 may be an identification number. The identification number is unique throughout the different geospatial hash maps 131 representing the same geospatial feature 103 at the location in the different geospatial hash maps 131.

Referring to FIG. 2, example components of the geospatial feature identification system 100 are schematically depicted. The geospatial feature identification system 100 may include one or more processors 204. Each of the one or more processors 204 may be any device capable of executing machine-readable and executable instructions. The instructions may be in the form of a machine-readable instruction set stored in data storage component 207 and/or a memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as for example, electrical signals via a conductive medium, electromagnetic signals via air, optical signals via optical waveguides, and the like.

Accordingly, the communication path 203 may be formed from any medium that is capable of transmitting a signal such as for example, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square wave, vibration, and the like, capable of traveling through a medium.

The geospatial feature identification system 100 may include one or more memory components 202 coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processors 204 along with the one or more memory components 202 may operate as a controller for the map data 101.

The one or more memory components 202 may include one or more modules, including the geospatial feature module 222 and the similarity module 232. Each of the one or more modules may include, but is not limited to, routines, subroutines, programs, objects, components, data structures, and the like for performing specific tasks or executing specific data types as will be described below. The data storage component 207 stores map data 101 and geospatial hash data 237. The map data 101 may include, without limitations, maps 111 of road networks 300, satellite images 115 of road networks 300, and local images 113 or videos of road networks 300. The geospatial hash data 237 may include the historical geospatial hashes 135 associated with the maps 111 of the road networks 300 stored in the map data 101. The geospatial feature module 222 and the similarity module 232 may also be stored in the data storage component 207 during operating or after operation.

The geospatial feature identification system 100 may include input/output hardware 205 coupled to the communication path 203. The input/output hardware 205 may include a monitor, keyboard, mouse, printer, camera, microphone, speaker, and/or other device for receiving, sending, and/or presenting data. The input/output hardware 205 may further include one or more user interfaces 215 as described herein.

The geospatial feature identification system 100 may include network interface hardware 206 for communicatively coupling the geospatial feature identification system 100 to external resources (e.g., vehicles or smart devices) and/or a server. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware, and/or any wired or wireless hardware for communicating with other networks and/or devices. In one embodiment, the network interface hardware 206 includes hardware configured to operate in accordance with the Bluetooth® wireless communication protocol. The network interface hardware 206 of the map data 101 may transmit its data to external resources (e.g., vehicles or smart devices) or a server. For example, the network interface hardware 206 of the geospatial feature identification system 100 may transmit map data 101, geospatial features 103, identical scores 105, and geospatial hash maps 131 with geospatial hashes 135 to or from external resources or a server.

In some embodiments, the geospatial feature identification system 100 may transfer various data generated from operation or/and stored in the geospatial feature identification system 100 to a server for extracting geospatial features 103, generating identical scores 105, generating geospatial hashes 135, and/or associating geospatial hashes 135 with different geospatial hash maps 131. The server may include one or more server processors, one or more server memory components, server data storage component, server network interface hardware, and a server local interface. The one or more server processors may be a controller, an integrated circuit, a microchip, a computer, or any other computing device. The one or more server memory components may comprise RAM, ROM, flash memories, hard drives, or any device capable of storing machine-readable and executable instructions such that the machine-readable and executable instructions can be accessed by the one or more server processors. The one or more server memory components may include one or more server modules, such as the geospatial feature module 222 and the similarity module 232. The server data storage component may store the map data 101 and the geospatial hash data 237. The one or more server modules may include, without limitations, routines, subroutines, programs, objects, components, data structures, and the like for performing specific tasks or executing specific data types.

Figure 3:
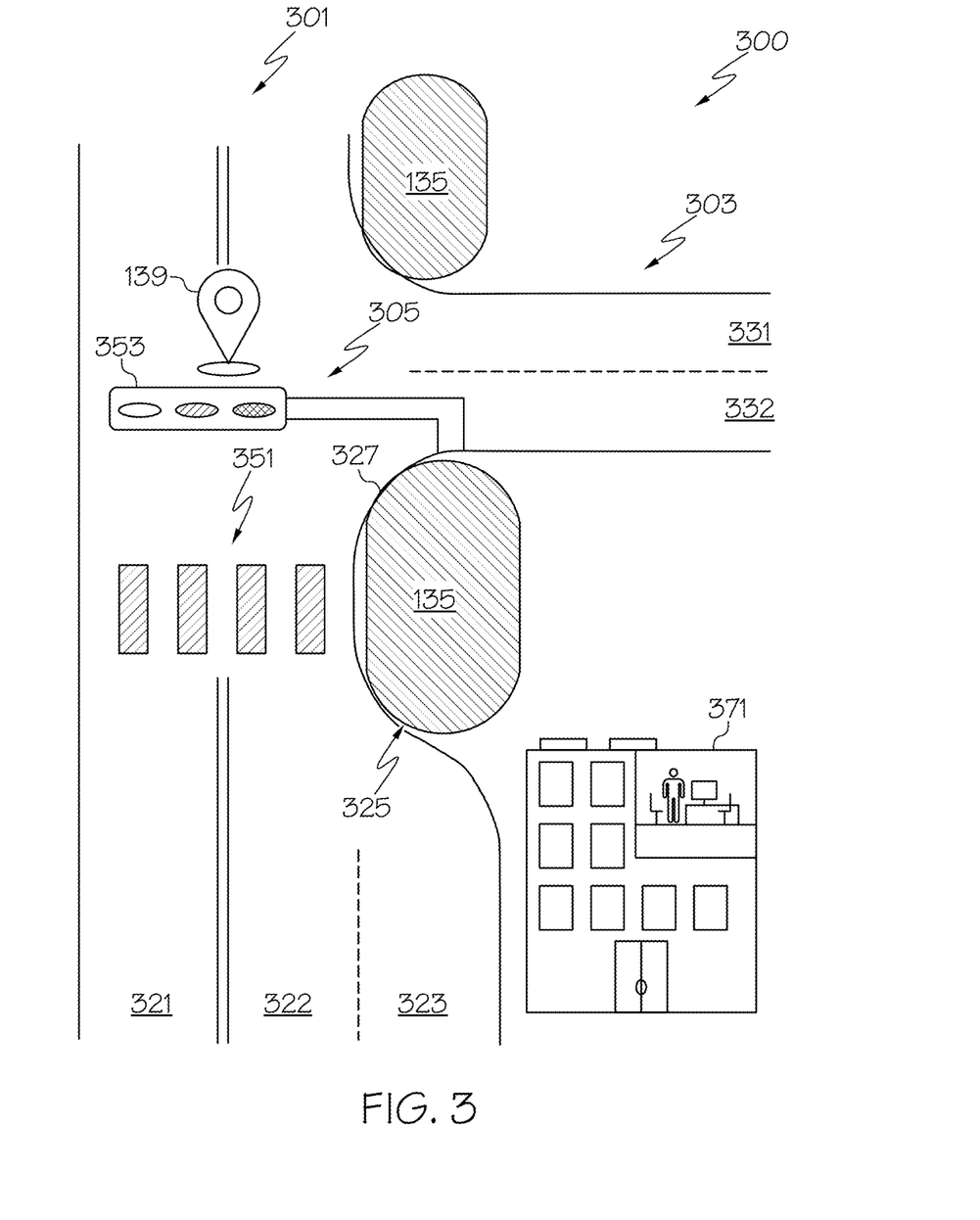
FIG. 3 schematically depicts an example road network with map geospatial features of the present disclosure, in accordance with one or more embodiments shown and described herewith.

Referring to FIG. 3, an example road network 300 with map geospatial features 103 is depicted. The information of the road network 300 is provided to the geospatial feature identification system 100 in the map data 101, such as maps 111, satellite images 115, and local images 113. The map data 101 may also include the location 139 of the road network 300. The map data 101 may include time information of the map data 101. For example, when the map 111 is generated, the satellite image 115 or the local image 113 is taken, or the time span for the map 111, the satellite image 115, or the local image 113 may represent the road network 300.

As illustrated in FIG. 3, the road network 300 may include a vertical road 301 and a horizontal road 303. The vertical road 301 may include three lanes, namely a lane 321 in one direction, and lanes 322 and 323 in the opposite direction, in some sections, and two lanes, namely the lane 321 and the lane 322, in the other sections. The horizontal road 303 may include two-way lanes, a lane 331, and a lane 332. The vertical road 301 and the horizontal road 303 may cross at an intersection 305. The lane 323 may end before the intersection 305 and an extended curb 325 on the right side of the vertical road 301 extends to narrow the vertical road 301. The curbs of the vertical road 301 and the horizontal road 303 may meet at the intersection 305 as intersection curbs 327.

The map data 101 further includes that around the intersection 305, a traffic light 353 may be included on the side of the extended curb 325, and a crosswalk 351 may cross the vertical road 301 near the traffic light 353 and at the extended curb 325. A building 371 is on the right side of the vertical road 301.

The geospatial feature module 222 may extract geospatial features 103 from the map data 101. The extracted geospatial features 103 may include the location 139, geospatial attributes, topological attributes, classification attributes, and temporal information. The geospatial attributes of the geospatial features 103 may include road junctions, road sections, bridges, tunnels, intersections, or a combination thereof. For example, as illustrated in FIG. 3, the geospatial feature module 222 may determine the geospatial attributes of the geospatial features 103 including the vertical road 301 with three lanes at some sections, and two lanes at some other sections, the horizontal road 303 with two lanes, and the intersection 305 of the vertical road 301 and the horizontal road 303.

The topological attributes of the geospatial features 103 may include shape, length, width, curvature, elevation, surface type, or a combination thereof. For example, as illustrated in FIG. 3, the geospatial feature module 222 may determine the topological attributes of the geospatial features 103 including the shape, length, width or the lanes (the lane 321, the lane 322, the lane 323, the lane 331, and the lane 332) of the road 301 and 303, the extended curb 325, the intersection curbs 327.

The classification attributes of the geospatial features 103 may include functional classification, road type, property use classification, or a combination thereof. The functional classification may include principal arterials, minor arterials, major collectors, and minor collectors in a transportation network. The road type may include paved, unpaved, gravel, asphalt, and concrete. The property use may include residential, commercial, agricultural, and industrial use. For example, as illustrated in FIG. 3, the geospatial feature module 222 may determine the classification attributes of the geospatial features 103 including the principal arterials as the functional classification, concrete road, and residential property use of the roads 301 and 303.

In some embodiments, the geospatial feature module 222 may determine that the building 371 near the right side of the vertical road 301 is a geospatial feature 103. The geospatial feature module 222 may determine that the crosswalk 351 and the traffic light 353 are not geospatial features 103.

The geospatial feature identification system 100 may assign the shared geospatial hash 135 to some of the geospatial features 103 after the geospatial feature identification system 100 determines that the geospatial features 103 are essentially the same geospatial feature 103 across different map data 101 and may further assign an identification number to the same geospatial feature 103 to be illustrated in the geospatial hash maps 131. For example, the geospatial feature identification system 100 may shadow an area of the shared geospatial hash 135 in the geospatial hash map 131 to depict the extended curb 325 and the intersection curbs 327. In some embodiments, the geospatial feature identification system 100 may use different colors or patterns to label different types of the geospatial features 103, for example, based on the geospatial attributes, the topological attributes, and the classification attributes of the road network 300.

The geospatial feature module 222 may extract geospatial features 103 from the map data 101 using spatial analysis. The geospatial feature module 222 may screen the map data 101 and extract potential geospatial features for the spatial analysis. The spatial analysis may include proximity analysis, clustering, density analysis, or a combination thereof. The proximity analysis may measure the distance between potential geospatial features across different map data 101 and evaluate the spatial relationships and patterns between the potential geospatial features. The proximity analysis may use various models to determine the distances and patterns between different potential geospatial features, such as a buffer zone model and a nearest neighbor model. The clustering analysis may group potential geospatial features based on their similarity to evaluate the features that share common characteristics. The clustering analysis may employ different models, such as K-means clustering and Hierarchical clustering. The density analysis may measure the concentration of the potential geospatial features within an area and evaluate the density of the features within the area. The density analysis may employ models such as Kernel density estimation, point density model, and line density model.

Figure 4:
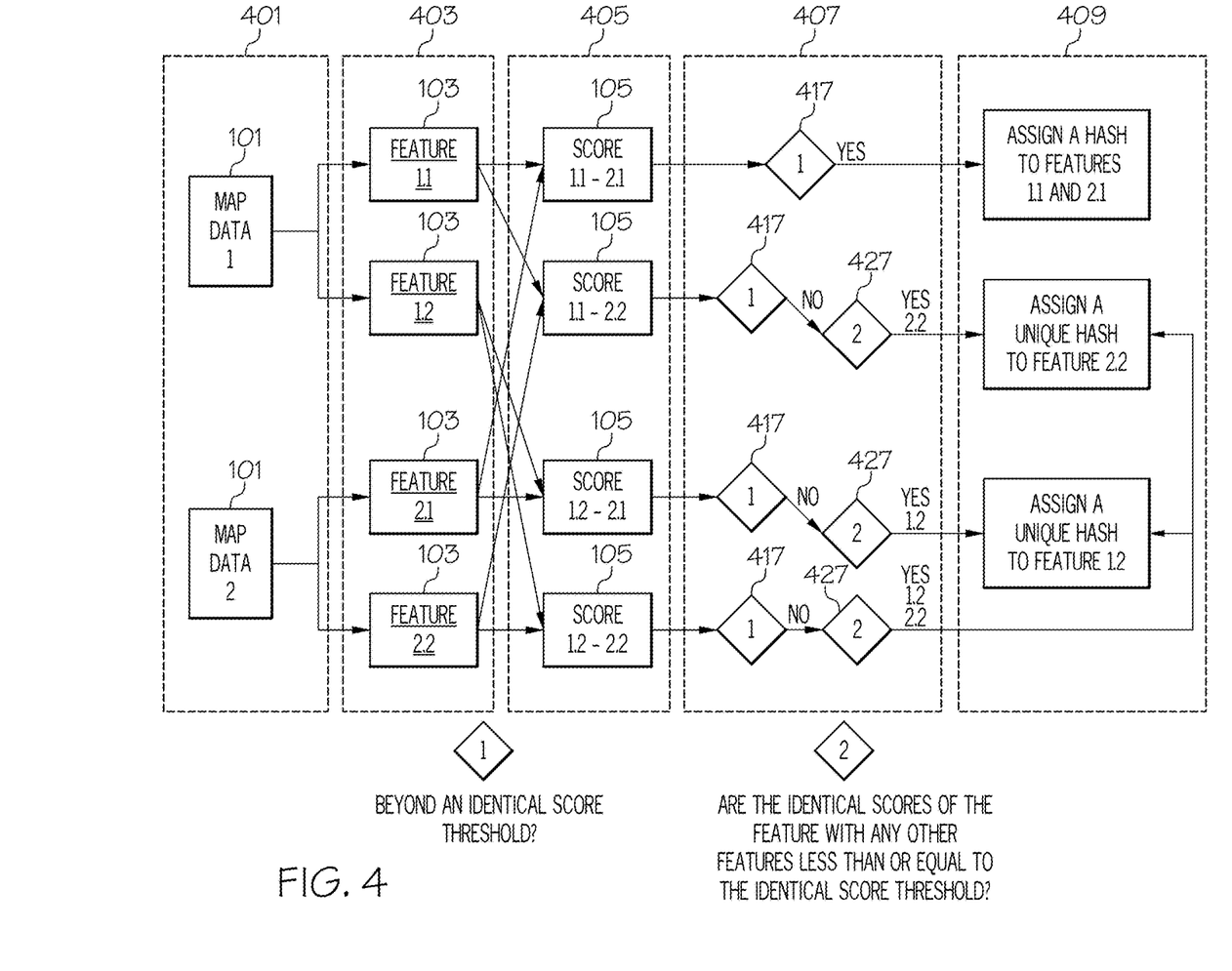
FIG. 4 depicts an illustrative block diagram of identifying map geospatial features of the present disclosure, according to one or more embodiments shown and described herein.

Referring to FIG. 4, an illustrative block diagram of identifying map geospatial features 103 is depicted. At block 401, the geospatial feature identification system 100 may receive two map data 101 (the map data 1 and map data 2) regarding the road network 300 at the location 139. At block 403, the geospatial feature identification system 100 may extract geospatial features 103 from the map data 101. For example, the geospatial feature module 222 may extract two geospatial features 1.1 and 1.2 from the map data 1, and two geospatial features 2.1 and 2.2 from the map data 2.

At block 405, the geospatial feature identification system 100 may calculate identical scores 105 between different geospatial features 103. For example, the similarity module 232 may calculate a similarity score 1.1-2.1 between the geospatial features 1.1 and 2.1, a similarity score 1.1-2.2 between the geospatial features 1.1 and 2.2, a similarity score 1.2-2.1 between the geospatial features 1.2 and 2.1, and a similarity score 1.2-2.2 between the geospatial features 1.2 and 2.2. In embodiments, the similarity module 232 may determine whether two or more of the geospatial features 103 derived from different map data 101 are of the same geometry type. The similarity module 232 may further align and scale the geospatial features 103 to a common scale to be compared using a variety of metrics, such as distance-based, shape-based, or attribute-based. The scores from these metrics can then be combined into a single similarity score. The similarity module 232 may conduct a feature comparison to the aligned and scaled geospatial features 103, such as distance-based similarity, shape-based similarity, or attribute-based similarity. The similarity module 232 may then combine the scores from different metrics into a single identical score 105 regarding the similarity between the geospatial features 103 using weighted averages or aggregation methods. The weight assigned to the metrics may depend on the geometry types that the geospatial feature identification system 100 is designed to identify.

The similarity module 232 may conduct similarity analysis to calculate the identical scores 105 of the geospatial features 103. The similarity analysis may include geometric similarity analysis, topological similarity analysis, semantic similarity analysis, or a combination thereof. The geometric similarity analysis involves assessing the likeness of shapes and spatial arrangements between geospatial features 103. The geometric similarity analysis may determine the similarity between geospatial features 103 based on metrics such as distance-based measurements and shape indices to quantify the degree of similarity (for example for comparing objects like building footprints or land parcels). The topological similarity analysis provides the spatial relationships and connectivity between different features, irrespective of the exact geometric forms of the geospatial features 103. The topological similarity analysis may utilize graph-based representations in evaluating how features interact, connect, or overlap for comparing road networks 300. The semantic similarity analysis analyzes the meaning or attributes associated with geospatial features, such as land use, land cover, or classification labels. For example, the semantic similarity analysis may compare the attributes of the geospatial features 103 and offers the thematic similarity between corresponding features in different map data 101. The similarity module 232 may also consider the temporal information of the geospatial features 103 in determining the similarity between geospatial features 103. The similarity module 232 may conduct a temporal alignment of the geospatial features 103 to form a time series data or compare geospatial features 103 at specific time points. The similarity module 232 may apply a higher weight to the similarity or dissimilarity of the geospatial features 103 at the same time points or close time points compared with the geospatial features 103 obtained in the map data 101 at remote time points.

At block 407, the geospatial feature identification system 100 may compare each of the calculated identical scores 105 with an identical score threshold. The identical score thresholds are predetermined and may change depending on the geospatial type of the compared geospatial features. For example, an identical score 105 of 0.5 might be considered high for comparing land cover maps with large, homogenous geospatial features, while an identical score 105 of 0.5 might be considered low for comparing detailed road network footprints. Accordingly, the identical score threshold for land cover maps with large, homogenous geospatial features 103 may be 0.5, while the identical score threshold for road network footprints may be 0.8. At block 417, the similarity module 232 may determine whether the calculated identical score 105 between two geospatial features 103 is beyond the identical score threshold.

At block 409, in response to a yes to block 417, the geospatial feature identification system 100 may assign a geospatial hash 135 to the geospatial features 103. For example, at block 409, if the comparison found a calculated identical score 105 between geospatial features 1.1 and 2.1 is beyond the identical score threshold at block 417, the geospatial feature identification system 100 may assign a shared geospatial hash 135 to the geospatial features 1.1 and 2.1.

At block 427, in response to a no to block 417, the similarity module 232 may further determine whether the identical score 105 between one of the geospatial features 103 and any other geospatial feature is less than or equal to the identical score threshold. For example, after receiving a no to 417 of the identical score 105 between geospatial features 1.1 and 2.2, the geospatial feature identification system 100 further determines that the identical scores between geospatial feature 2.2 with any other geospatial features 1.1, 1.2, and 2.1 are less than or equal to the identical score threshold, at block 409, the geospatial feature identification system 100 may assign a unique geospatial hash 135 to feature 2.2. Similarly, the geospatial feature identification system 100 may determine that the identical scores 105 between geospatial feature 1.2 with any other geospatial features 1.1, 2.1, and 2.2 are less than or equal to the identical score threshold, at block 409, the geospatial feature identification system 100 may assign a unique geospatial hash 135 to feature 1.2.

Accordingly, at block 409, the geospatial feature identification system 100 may assign shared geospatial hash 135 between multiple geospatial features 103 in response to determining that the identical score 105 between the geospatial features 103 is beyond the identical score threshold. The shared geospatial hash 135 may be exchangeably used in different geospatial hash maps 131 where the shared geospatial hash 135 represents the same geospatial feature 103. Further, the geospatial feature identification system 100 may assign unique geospatial hash 135 to a geospatial feature 103 in response to determining that the identical score 105 between the geospatial feature 103 and any other geospatial features 103 is less than or equal to the identical score threshold. In some embodiments, the geospatial feature identification system 100 may align the geospatial hashes 135 at the same location 139 in temporal sequences for the evolution of road network geospatial features 103 over time.

Figure 5:
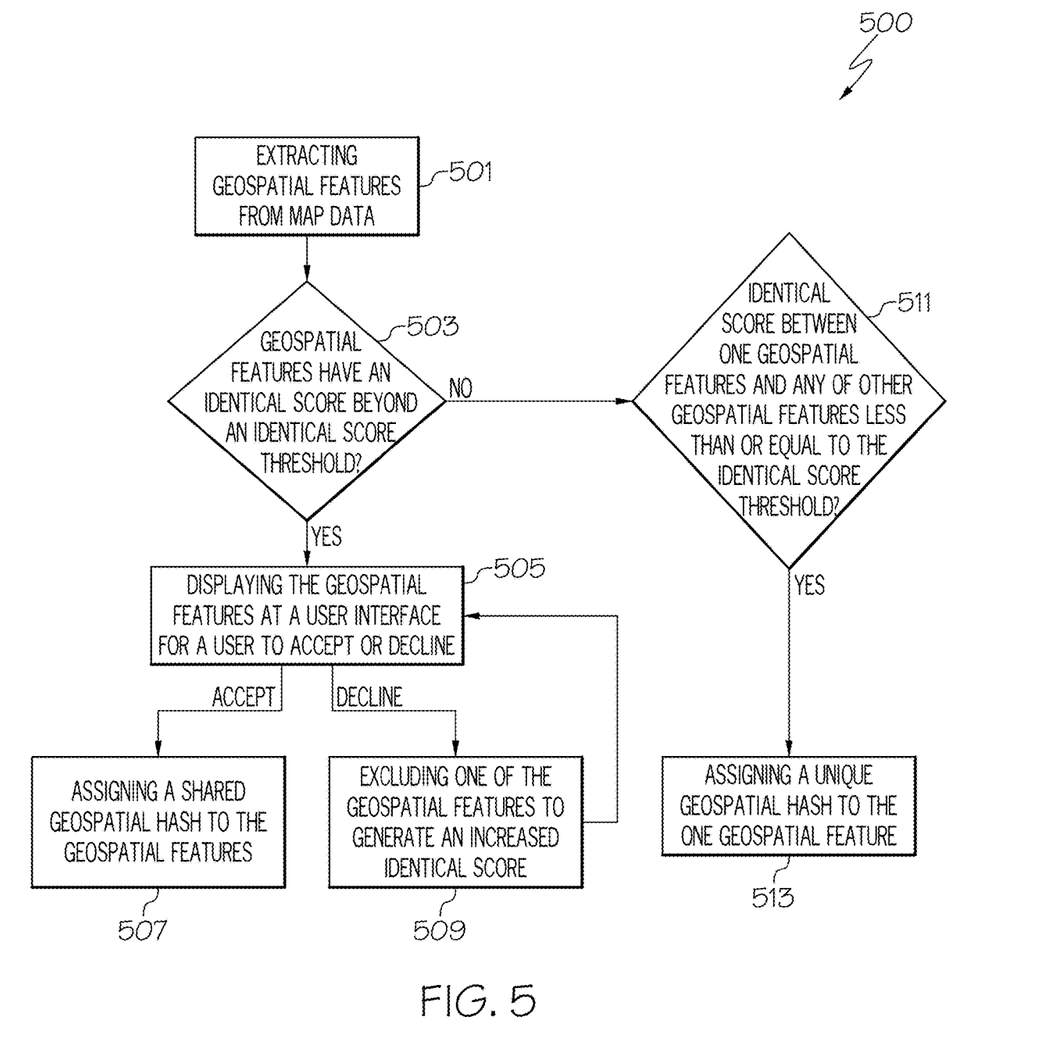
FIG. 5 depicts a flowchart of illustrative steps for identifying map geospatial features with a user interface of the present disclosure, according to one or more embodiments shown and described herein.
Figure 6:
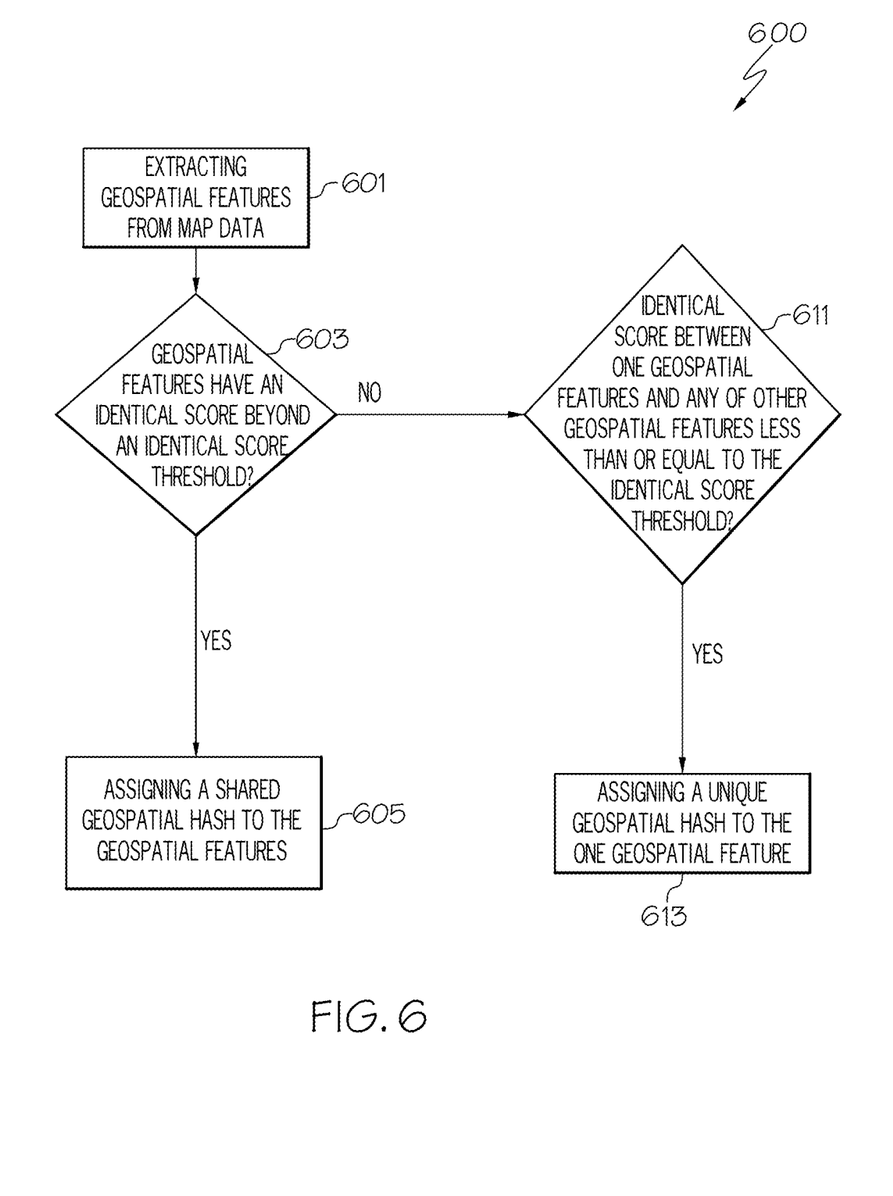
FIG. 6 depicts a flowchart of illustrative steps for identifying map geospatial features without a user interface of the present disclosure, according to one or more embodiments shown and described herein.

Referring to FIGS. 5 and 6, flowcharts of methods 500 and 600 for identifying map geospatial features 103 with the user interface 5 (FIG. 5) and without the user interface (FIG. 6) are depicted. At blocks 501 and 601, the present methods 500 and 600 include extracting, through spatial analysis, geospatial features 103 from map data 101 of a road network 300 at a location 139. The geospatial features 103 may include the location 139, geospatial attributes, topological attributes, classification attributes, and temporal information. At blocks 503 and 603, the present methods 500 and 600 include determining, through a similarity analysis, whether two or more of the geospatial features 103 have an identical score 105 beyond an identical score threshold.

At block 505, in response to a yes to 503, the present method 500 includes displaying the two or more of the geospatial features 103 at a user interface 215 for a user to accept or decline to assign a shared geospatial hash 135. At block 507, in response to an acceptance to block 505, the present method 500 includes assigning the shared geospatial hash 135 to the two or more geospatial features 103 in geospatial hash maps 131 of the road network 300. At block 509, in response to a decline to block 505, the present method 500 may include excluding one of the two or more of the geospatial features 103 to generate an increased identical score 105 and further move to block 505 to display the remaining of the two or more of the geospatial features 103 at the user interface 215 for the user to accept or decline.

At block 605, in response to a yes to 603, the present method 600 includes assigning the shared geospatial hash 135 to the two or more geospatial features 103 in geospatial hash maps 131 of the road network 300.

At blocks 511 and 611, in response to a no at blocks 503 and 603, the present methods 500 and 600 may include determining whether an identical score 105 between one of the geospatial features 103 and any of other geospatial features 103 at the location 139 is less than or equal to the identical score threshold. At blocks 513 and 613, in response to a yes to blocks 511 and 611, the present methods 500 and 600 may include assigning a unique geospatial hash 135 to the one of the geospatial features 103. In response to a no to blocks 511 and 611, the present methods 500 and 600 may return to the blocks 501 and 601.

In some embodiments, the spatial analysis may include proximity analysis, clustering, density analysis, or a combination thereof. The geospatial feature module 222 may screen the map data 101 and extract potential geospatial features for the spatial analysis. The proximity analysis may measure the distance between potential geospatial features across different map data 101 and evaluate the spatial relationships and patterns between the potential geospatial features. The proximity analysis may use various models to determine the distances and patterns between different potential geospatial features, such as a buffer zone model and a nearest neighbor model. The clustering analysis may group potential geospatial features based on their similarity to evaluate the features that share common characteristics. The clustering analysis may employ different models, such as K-means clustering and Hierarchical clustering. The density analysis may measure the concentration of the potential geospatial features within an area and evaluate the density of the features within the area. In some embodiments, the density analysis may employ models such as Kernel density estimation, point density model, and line density model.

In some embodiments, the similarity analysis may include geometric similarity analysis, topological similarity analysis, semantic similarity analysis, or a combination thereof. The geometric similarity analysis may assess the likeness of shapes and spatial arrangements between geospatial features 103. The geometric similarity analysis may determine the similarity between geospatial features 103 based on metrics such as distance-based measurements and shape indices to quantify the degree of similarity (for example for comparing objects like building footprints or land parcels). The topological similarity analysis provides the spatial relationships and connectivity between different features, irrespective of the exact geometric forms of the geospatial features 103. The topological similarity analysis may utilize graph-based representations in evaluating how features interact, connect, or overlap for comparing road networks 300. The semantic similarity analysis analyzes the meaning or attributes associated with geospatial features, such as land use, land cover, or classification labels. For example, the semantic similarity analysis may compare the attributes of the geospatial features 103 and offers the thematic similarity between corresponding features in different map data 101. The similarity module 232 may also consider the temporal information of the geospatial features 103 in determining the similarity between geospatial features 103. The similarity module 232 may conduct a temporal alignment of the geospatial features 103 to form a time series data or compare geospatial features 103 at specific time points. The similarity module 232 may apply a greater weight to the similarity or dissimilarity of the geospatial features 103 at the same time points or close time points compared with the geospatial features 103 obtained in the map data 101 at remote time points. In some embodiments, the shared geospatial hash 135 may include an identification number. Similarly, the unique geospatial hash 135 may include an identification number.

In some embodiments, the geospatial attributes of the geospatial features 103 may include road junctions, road sections, bridges, tunnels, intersections, or a combination thereof. The topological attributes of the geospatial features 103 may include shape, length, width, curvature, elevation, surface type, or a combination thereof. The classification attributes of the geospatial features 103 may include functional classification, road type, property use classification, or a combination thereof. The map data 101 may include the maps 111 (e.g., as in FIG. 1) of the road network 300, satellite images 115 (e.g., as in FIG. 1) of the road networks 300, local images 113 (e.g., as in FIG. 1) or videos of the road networks 300, or a combination thereof.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus for identifying map geospatial features comprising a processor operable to:
    extract, through spatial analysis, geospatial features from map data of a road network at a location, the geospatial features comprising a location, geospatial attributes, topological attributes, classification attributes, and temporal information;
    determine, through a similarity analysis, whether two or more of the geospatial features have an identical score greater than an identical score threshold;
    in response to determining that the identical score of the two or more of the geospatial features is greater than the identical score threshold, assign two or more geospatial features in maps of the road network to a geospatial hash.

2. The apparatus of claim 1, wherein the spatial analysis comprises proximity analysis, clustering, density analysis, or a combination thereof.

3. The apparatus of claim 1, wherein the similarity analysis comprises geometric similarity analysis, topological similarity analysis, semantic similarity analysis, or a combination thereof.

4. The apparatus of claim 1, wherein the geospatial attributes of the geospatial features comprise road junctions, road sections, bridges, tunnels, intersections, or a combination thereof.

5. The apparatus of claim 1, wherein the topological attributes of the geospatial features comprise shape, length, width, curvature, elevation, surface type, or a combination thereof.

6. The apparatus of claim 1, wherein the classification attributes of the geospatial features comprise functional classification, road type, property use classification, or a combination thereof.

7. The apparatus of claim 1, wherein the map data comprises the maps of the road network, satellite images of the road networks, local images or videos of the road networks, or a combination thereof.

8. The apparatus of claim 1, wherein the geospatial hash comprises an identification number.

9. The apparatus of claim 1, wherein the processor is operable further to:
    determine whether the identical score between one of the geospatial features and any of other geospatial features at the location is less than or equal to the identical score threshold,
    in response to determining that the identical score of the one of the geospatial features is less than or equal to the identical score threshold, assign a unique geospatial hash to the one of the geospatial features.

10. The apparatus of claim 1, wherein the processor is operable further to displaying the two or more of the geospatial features at a user interface for a user to accept or decline to assign a shared geospatial hash.

11. The apparatus of claim 10, wherein the processor is further operable to: in response to an acceptance from the user, assigning the geospatial hash to the two or more geospatial features in maps of the road network; and in response to a decline from the user, exclude one of the two or more of the geospatial features to generate an increased identical score and display remaining of the two or more of the geospatial features at the user interface.

12. A method for identifying map geospatial features comprising:
   extracting, through spatial analysis, geospatial features associated with a road network at a location from map data, the geospatial features comprising the location, geospatial attributes, topological attributes, classification attributes, and temporal information;
   determining, through a similarity analysis, whether two or more of the geospatial features have an identical score greater than an identical score threshold;
   in response to determining that the identical score of the two or more of the geospatial features is greater than the identical score threshold, assigning two or more geospatial features in maps of the road network to a geospatial hash, where the geospatial hash comprises an identification number.

13. The method of claim 12, wherein the spatial analysis comprises proximity analysis, clustering, density analysis, or a combination thereof.

14. The method of claim 12, wherein the similarity analysis comprises geometric similarity analysis, topological similarity analysis, semantic similarity analysis, or a combination thereof.

15. The method of claim 12, wherein the geospatial attributes of the geospatial features comprise road junctions, road sections, bridges, tunnels, intersections, or a combination thereof.

16. The method of claim 12, wherein the topological attributes of the geospatial features comprise shape, length, width, curvature, elevation, surface type, or a combination thereof.

17. The method of claim 12, wherein the classification attributes of the geospatial features comprise functional classification, road type, property use classification, or a combination thereof.

18. The method of claim 12, wherein the map data comprises the maps of the road network, satellite images of the road networks, local images or videos of the road networks, or a combination thereof.

19. The method of claim 12, wherein the method further comprises:
   determining whether the identical score between one of the geospatial features and any of other geospatial features at the location is less than or equal to the identical score threshold,
   in response to determining that the identical score of the one of the geospatial features is less than or equal to the identical score threshold, assigning a unique geospatial hash to the one of the geospatial features.

20. The method of claim 11, wherein the method further comprises:
   displaying the two or more of the geospatial features at a user interface for a user to accept or decline to assign a geospatial hash;
   in response to an acceptance from the user, assigning the geospatial hash to the two or more geospatial features in maps of the road network;
   in response to a decline from the user, excluding one of the two or more of the geospatial features to generate an increased identical score and displaying remaining of the two or more of the geospatial features at the user interface.

* * * * *